O. ZERK.
GREASE CUP.
APPLICATION FILED FEB. 19, 1912.

1,138,526.

Patented May 4, 1915.

WITNESSES:
Oliver M. Kappler.
Chas. O. Watt

INVENTOR
Oscar Zerk
BY Albert H. Bates,
ATTORNEY

UNITED STATES PATENT OFFICE.

OSCAR ZERK, OF CLEVELAND, OHIO, ASSIGNOR, BY MESNE ASSIGNMENTS, TO GEORGE W. BOWEN, OF AUBURN, NEW YORK.

GREASE-CUP.

1,138,526.  Specification of Letters Patent.  Patented May 4, 1915.

Application filed February 19, 1912. Serial No. 678,703.

*To all whom it may concern:*

Figure 1:
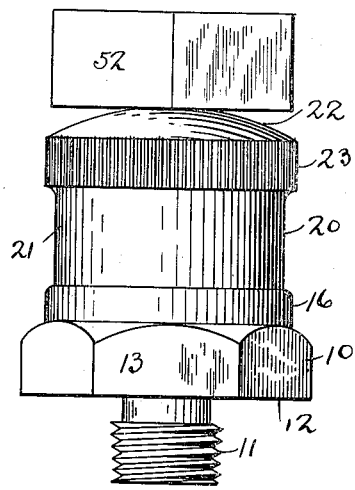
Figure 2:
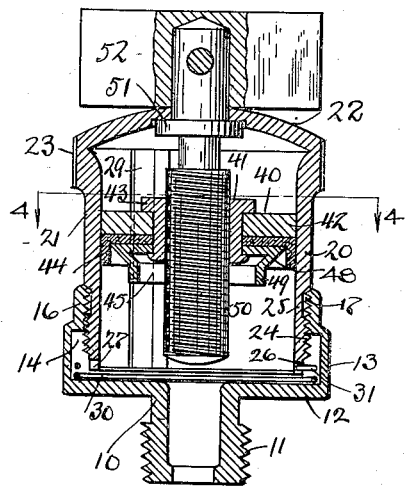
Figure 3:
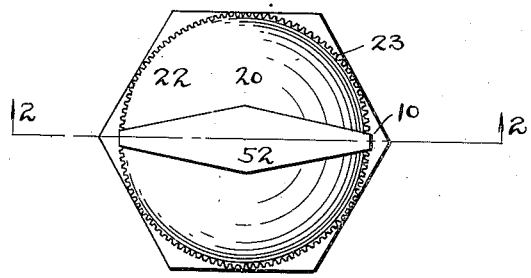
Figure 4:
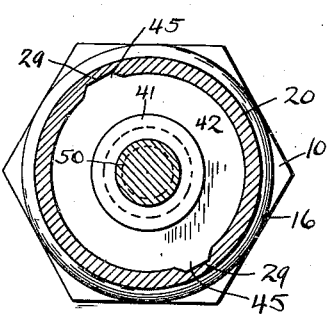
Figure 5:
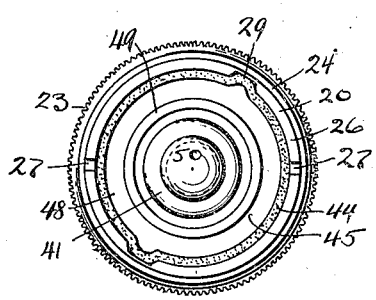
Figure 6:
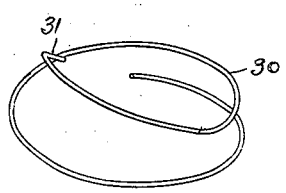

Be it known that I, OSCAR ZERK, a subject of the Emperor of Austria-Hungary, residing at Cleveland, in the county of Cuyahoga and State of Ohio, have invented a certain new and useful Improvement in Grease-Cups, of which the following is a full, clear, and exact description, reference being had to the accompanying drawings.
This invention relates to grease cups of the type wherein there are two separable screw threaded parts adapted to be separated for the insertion of the grease but stationary in operation.
One of the objects of the invention is to provide a very effective means entirely hidden within the cup for preventing inopportune or accidental separation of the parts or loosening of their engagement.
In the drawing, Figure 1 is a side elevation of my grease cup; Fig. 2 is a vertical section thereof; Fig. 3 is a plan; Fig. 4 is a horizontal section; Fig. 5 is a bottom view of the upper portion or cap of the grease cup removed; and Fig. 6 is a perspective view of the locking spring carried by the cup of the device.

As shown in the drawing, 10 represents the base or cup of my approved grease cup.
This is shown as having an externally threaded nipple 11 by which it may be screwed into a suitable opening. Above this nipple is a flat bottom wall 12 from the outer edge of which rises a flange or wall, which at its base is preferably hexagonal externally, as shown at 13, and internally has a cylindrical recess 14. Above the hexagonal exterior the base continues with a portion 16, which has a cylindrical exterior and internally has screw threads 17.

The cap of my cup is designated 20 and is shown as having a wall and top made integrally and designated respectively 21 and 22. Near its upper end the wall may be provided with an enlarged knurled portion 23 for convenience in turning. Near the lower portion of the cap the wall fits within the threaded flange of the base and is provided with external threads 24 and has reduced unthreaded portions or grooves 25 and 26 above and below these threads respectively. By providing this unthreaded groove 25 I may make the threads 24 of sufficient depth in a cap wall of minimum thickness, and also have the annular shoulder on the upper wall of the groove 25 to abut the top of the base and make a grease-tight joint. This obviates either thickening the wall of the cap above the threads or making the threaded portion of the cap unnecessarily thin. In the bottom of the portion 26, that is the lower edge of the cap, are formed one or more notches 27. In the drawing there are two of such notches diametrically opposite each other. The opposite walls of these notches 27 constitute engaging shoulders, and the lower edge of the cap and said shoulders at opposite sides of the notches 27 constitute engaging means on the lower end of the cap for coacting with the spring member, presently described.

30, in Fig. 2, designates a suitable spring contained within the cup and having a portion which automatically seats within one of the notches of the cap as the same is being screwed into position, whereby the cap, when turned home, is locked against inadvertent displacement. Such a spring may be of various forms. Figs. 2 and 6 show it as a coiled spring made preferably of a piece of wire and having something more than one complete turn. This spring lies within the annular recess in the base with one end detachably resting against the upper face of the substantially flat bottom of the base, and its other end provided with an upwardly extending resilient portion spaced apart from the bottom of the base and movable toward and from such bottom, this resilient portion being provided with an inwardly projecting upper end 31 which stands in the path of the cap as it is screwed into the cup and is adapted to become engaged in either of the notches 27 in the cap. This spring, measured from the bottom toward the projecting end 31, extends in the direction in which the cap is turned to screw it into the cup. Accordingly, as the cap is being screwed home, the lower edge thereof rides over the spring projection 31 until the latter, by reason of the spring being forced downwardly, springs up into one of the notches 27. After this takes place, the continued rotation of the cap draws the spring with it. Now, as the spring is coiled in the same direction in which the cap is turning, it has very slight retarding action against such turning, but when it is attempted to turn the cap in the opposite direction, the shoving of the spring backs it up into tight engagement with the wall of the recess and thus interposes a much increased friction to the turning of the cap.

It will be understood from the above description that the cap may be freely screwed in, but that there is a decided retardation against screwing it out. This is a very valuable feature, as it provides a very simple and, at the same time, effective lock, producing just the desired result. The feature of a creeping spring which acts harder in one direction than the other, I believe to be broadly comprehended within my invention.

To feed the grease contained in the cap 20 toward the bore of the base I provide within the cap a plunger 40 operated by a central screw threaded stem 50. The stem extends through an opening in the cap head and has preferably an integral collar 51 below the cap head. Above the cap a suitable head 52 is provided on the stem, the head shown being a transverse bar receiving and pinned to the stem. This bar is shown as diamond-shaped in cross section, which adds to its appearance and convenience of manufacture. When this bar is turned, the rotation of the stem causes the plunger to travel downwardly, forcing the grease into the bore, it being understood that, in such operation, the plunger does not turn.

To prevent the plunger turning and at the same time make a tight fit with the wall of the cap, I make one or more vertical grooves 29 in the wall of the cap and I make the plunger in a peculiar manner to coöperate with these grooves, as shown herein, and as will be now described. The plunger, designated 40, as a whole, consists of a bushing 41 surrounding and screw threaded on the plunger 50; a metal washer 42 surrounding the bushing and bearing against a head 43 thereof; a leather washer 44 surrounding the bushing and lying against the metal washer; and a clamping plate 45 surrounding the bushing and lying against the leather washer, all these parts being held in place by an outward flanging or upsetting on the lower end of the bushing. The metal washer 42 has a generally cylindrical exterior, except that it is provided with one or more outward lugs 45 adapted to occupy the grooves 29 of the cap. The leather washer is provided at its outer edge with the downward flange which hugs the inner wall of the cap. The clamping plate 45 is provided with a flange 48 extending inwardly away from the flange of the leather washer and then has a downward extension 49. In operation, the pressure of the grease when the plunger is forced downwardly, acts outwardly on the leather flange, keeping it tight against the wall, and I have found in practice that this leather flange bends into the grooves 29 and maintains a substantially tight connection at these points, notwithstanding the grooves. The flange 49 is to limit the downward movement of the plunger, preventing the leather flange descending far enough to strike the bottom of the cup, which might crumble the flange. The construction of the plunger is simple and at the same time very effective. The simple turning of the head 52 screws the plunger downwardly to feed the grease. I prefer to make the threads on the stem left handed, so that the right hand turning of the head will screw the plunger downwardly.

The cap of my grease cup, while it may be easily separated for charging, is held against accidental displacement, when screwed into the base, by reason of the lock described. After the grease cup is filled and closed, the only attention necessary is an occasional turning of the head to feed the grease, and when the grease has been entirely fed, the operator is advised thereof by the head refusing to turn further, which results from the plunger flange abutting the base. With these advantages of operation are combined a great neatness in appearance of the grease cup and simplicity of the parts, resulting in cheapness of manufacture.

Having thus described my invention, what I claim is:

1. In a device of the character described, the combination, of two coöperating members, one externally threaded and the other internally threaded, an annular recess in the internally threaded member, a coiled spring lying in the annular recess, and a shoulder on the externally threaded member adapted to engage the spring when the latter member is screwed into place.

2. In a grease cup, the combination, of a cup and a cap having a screw threaded engagement with each other, a locking device carried by one of such members and movable in an annular course thereon independently of its support, and means on the other member for automatically engaging said device and moving it bodily when the cap and cup are screwed together.

3. In a grease cup, the combination, of a cup and a cap having a screw threaded engagement with each other and a coiled spring freely carried within and surrounded by the cup and engaging the cap, said spring extending in such direction that the rotation to turn the cap on draws the spring around, while the rotation in the direction to turn the cap off shoves on the spring and forces its outer surface into a more binding engagement with the cupp.

4. In a grease cup, the combination, of a cup and cap, said members coöperating and one member having an internal thread and the other an external engaging thread, the member with the internal thread having an annular internal recess and the member with the external thread having a notch, and a spring loosely carried to travel bodily in the recess independently of the internally threaded member and adapted to engage in the notch.

5. In a device of the character described, the combination, of two coöperating members, one externally threaded and the other internally threaded, an annular recess in the internally threaded member, a notch in the externally threaded member, and a coiled spring lying in the annular recess and having a projection adapted to engage the notch, said spring freely occupying the recess whereby it may be drawn around therein and being compressible within the recess as the notched member is screwed into the other member, whereby the spring has its projection caused to automatically enter the notch.

6. In a grease cup, the combination of a base having a threaded nipple with a bore, a flange extending upwardly from the base and having first an internal annular recess and above that an interally threaded portion, a cap adapted to screw into the base and having external threads to engage the internal threads, the lower edge of the cap having a notch, and a coiled spring freely occupying the anuular recess and having an inward projection adapted to stand in the path of the lower end of the cap and be forced downwardly by the cap and then spring upwardly into the notch in the cap, the spring coiling toward its projecting end in the direction which the cap takes in being rotated into the cup.

7. In a grease cup, the combination of a base, a cap having a screw threaded engagement therewith, means within the cap and movable relatively thereto for ejecting the grease, and a friction lock within the base controlled by the cap and controlling the relative rotation of the base and cap.

8. In a grease cup, the combination of a base having an internal thread, a cap having a top and a wall with an external thread near its lower end which engages the internal thread of the base, a spring lock within the base adapted to engage the lower end of the cap, when the cap is screwed into the base and to be disengaged from said lower end when the cap is screwed out of the base, and means within the cap and supported by the top thereof for ejecting the grease.

9. In a grease cup, the combination of a base having an internal thread, a cap having an external thread adapted to screw into the base, means for making a tight connection between the cap and base when the cap is turned home, a notch in the cap wall, a spring inclosed within the base adapted to enter said notch, a plunger within the cap, and means extending outside of the cap for moving the plunger toward the base.

10. In a grease cup, the combination of a base, a cap screwing into the base and having a notch on its lower edge, and a locking spring carried within the base, the notch and the spring, upon movement of the cap into the base, being brought into coaction to hold the cap from movement relatively to the base, and said notch and spring being separable, upon movement of the cap out of the base, substantially as described.

11. In a grease cup, the combination of a base having an internally threaded wall, a cap having an externally threaded wall and adapted to be screwed into the base, said cap being provided with notches in the lower edge of its wall, and a spring within the base pressing toward the cap and having a projection, the projection being adapted to automatically seat in a notch of the cap as the latter is being screwed into place and being separable from said notch as the cap is screwed out of place, substantially as described.

12. In a grease cup and in combination, a base having a flange, a cap having an end fitting within the flange, parts on the flange and said end of the cap interlocking by the relative rotation of the base and the cap, and a spring member confined within the base, the cap having engaging means for coacting with the spring to resist relative rotation of the base and cap, said spring member and engaging means being brought into coaction upon relative rotation of the base and cap in one direction and being separable out of coaction upon said relative rotation in the opposite direction, substantially as described.

13. In a grease cup and in combination, a base having a flange, a cap having a part fitting within the flange, and provided with engaging means at the open end thereof, said base and cap having means interlocking by the relative rotation of the base and the cap, and a spring member located in the base and provided with a resilient portion adapted to be tensioned by the cap upon relative rotation of the base and the cap in one direction, and the engaging means at the open end of the cap and the resilient portion of the spring member being brought into coaction upon the relative rotation of the base and the cap in said direction, and being separable out of coaction upon said relative rotation in the opposite direction, substantially as described.

14. In a grease cup and in combination, a base having an internally threaded flange, a cap having a portion adjacent its open end externally threaded for engagement with the flange, a spring member located in the base and having a resilient portion spaced apart from the bottom of the base and movable toward and from such bottom, said resilient portion having means movable into and out of engagement with the open end of the cap as said cap is screwed into and out of the base, and means within the cap and movable relatively thereto for forcing the grease from the grease cup, substantially as and for the purpose specified.

15. In a grease cup and in combination, a base having an internally threaded flange, a cap having a portion adjacent its open end externally threaded for engagement with the flange, a spring member carried by the base within the flange and having a yielding portion spaced apart from the underlying surface of the base and movable toward and from said surface, the cap having engaging means at its lower end for coacting with the yielding portion of the spring member to move the same toward the underlying surface of the base and thereby tension said yielding portion, the spring member and the engaging means coacting for retarding turning movement of the cap relatively to the base, and said engaging means being movable into and out of engagement with said yielding portion of the spring member as the cap is screwed into and out of the base, and means within the cap and movable relatively thereto for forcing the grease from the grease cup, substantially as and for the purpose set forth.

16. In a grease cup and in combination, a base having a substantially flat bottom and a surrounding flange internally threaded, a cap having a portion adjacent its open end externally threaded for engagement with the flange, said open end being provided with engaging means on its lower edge, a spring member resting against the bottom of the base and having an upwardly extending yielding portion provided with a part for coacting with said engaging means, and means within the cap and movable relatively thereto for forcing the grease from the grease cup, substantially as and for the purpose described.

17. In a grease cup and in combination, a base having an internally threaded flange, a cap having a portion thereof adjacent its open end externally threaded for engagement with the flange, a spring member carried by the base within the flange and being free from tension until the cap approaches the limit of its movement within the flange, the cap being provided with engaging means for coacting with the spring member and tensioning said spring member just before the cap reaches the limit of its movement within the flange in order that the initial reverse movement of the cap may be retarded and the final reverse movement of the cap may be free from retarding action by said spring member, and means within the cap and movable relatively thereto for forcing the grease from the grease cup, substantially as and for the purpose set forth.

18. In a grease cup and in combination, a base having an internally threaded flange, a locking member located within the base and having a resilient engaging portion disposed eccentrically of the axis of the base and movable toward and from the bottom of the base, a cap having an externally threaded part for engaging the threaded flange on the base, and having means at its open end detachably coöperating with said engaging portion of the locking member, and means independent of the connection between the cap and the base for forcing the grease from the cup, substantially as and for the purpose specified.

19. In a grease cup and in combination, a cap having a top and provided with engaging means at its open end, a threaded stem journaled in the top of the cap, a non-rotatable plunger carried by the stem and movable axially within the cap as the stem is rotated, a base having a flange, parts on said flange and cap for inter-engaging by a relative turning of the cap and the base, and a member within the flange of the base and having a resilient portion tensioned by the cap and provided with a part for detachably coacting with said engaging means, substantially as and for the purpose described.

20. In a grease cup and in combination, a base having an internally threaded flange, a cap having a portion adjacent its open end externally threaded for engagement with the flange, a spring member carried by the base within the flange and having a yielding portion spaced apart from the underlying surface of the base and movable toward and from said surface, the cap having engaging means at its lower end for coacting with the yielding portion of the spring member and forcing the same toward the underlying surface of the base as the cap is turned in one direction, and thereby tensioning said yielding portion to retard the turning of the cap, said engaging means and spring member coöperating to force the spring member against the inner face of the flange as the cap is turned in the reverse direction and thereby retard the reverse movement of the cap with additional force, and means within the cap and movable relatively thereto for forcing the grease from the grease cup, substantially as and for the purpose specified.

21. In a grease cup and in combination, a base having an internally threaded flange provided with an engaging face at its upper end, a cap having a portion adjacent its open end externally threaded for engagement with the flange, and having an annular groove directly above said threaded portion, the upper wall of the groove coacting with said engaging face for preventing the escape of grease, a spring member carried by the base within the flange and having a portion coacting with the wall of the open end of the cap as said face and the upper wall of the groove are about to contact with each other, whereby the final turning movement of the cap within the flange tensions the spring member to retard the initial reverse movement of the cap, and means within the cap and movable relatively thereto for forcing the grease from the grease cup, substantially as and for the purpose set forth.

In testimony whereof, I hereunto affix my signature in the presence of two witnesses.

OSCAR ZERK.

Witnesses:
 ALBERT H. BATES,
 GERTRUDE K. SMITH.